United States Patent
Song et al.

(10) Patent No.: US 12,545,819 B2
(45) Date of Patent: Feb. 10, 2026

(54) ADHESIVE FILM, METHOD FOR MANUFACTURING SAME, AND FOLDABLE DISPLAY DEVICE COMPRISING SAME

(71) Applicant: LG CHEM, LTD., Seoul (KR)

(72) Inventors: Hee Song, Daejeon (KR); Hyun Cheol Kim, Daejeon (KR); Hyon Gyu Park, Daejeon (KR)

(73) Assignee: Xinmei Fontana Holding (Hong Kong) Limited, Hong Kong (CN)

(*) Notice: Subject to any disclaimer, the term of this patent is extended or adjusted under 35 U.S.C. 154(b) by 1084 days.

(21) Appl. No.: 17/426,977

(22) PCT Filed: Aug. 5, 2020

(86) PCT No.: PCT/KR2020/010360
§ 371 (c)(1),
(2) Date: Jul. 29, 2021

(87) PCT Pub. No.: WO2021/025475
PCT Pub. Date: Feb. 11, 2021

(65) Prior Publication Data
US 2022/0112413 A1    Apr. 14, 2022

(30) Foreign Application Priority Data
Aug. 5, 2019    (KR) .................. 10-2019-0094795

(51) Int. Cl.
| | | |
|---|---|---|
| *C09J 133/08* | (2006.01) | |
| *C08F 220/06* | (2006.01) | |
| *C08F 220/18* | (2006.01) | |
| *C08F 220/20* | (2006.01) | |
| *C08G 77/12* | (2006.01) | |
| *C08G 77/20* | (2006.01) | |

(Continued)

(52) U.S. Cl.
CPC .......... *C09J 133/08* (2013.01); *C08F 220/06* (2013.01); *C08F 220/1804* (2020.02); *C08F 220/1808* (2020.02); *C08F 220/1812* (2020.02); *C08F 220/20* (2013.01); *C08G 77/12* (2013.01); *C08G 77/20* (2013.01); *C09J 7/10* (2018.01);
(Continued)

(58) Field of Classification Search
None
See application file for complete search history.

(56) References Cited

U.S. PATENT DOCUMENTS

| | | |
|---|---|---|
| 6,524,675 B1 | 2/2003 | Mikami et al. |
| 9,890,257 B2 | 2/2018 | Lee et al. |

(Continued)

FOREIGN PATENT DOCUMENTS

| | | |
|---|---|---|
| CN | 106318241 A | 1/2017 |
| JP | 2006-299283 A | 11/2006 |

(Continued)

OTHER PUBLICATIONS

International Search Report and Written Opinion issued for International Application No. PCT/KR2020/010360 on Nov. 19, 2020, 11 pages.

*Primary Examiner* — Scott R. Walshon
(74) *Attorney, Agent, or Firm* — Ricky Lam

(57) ABSTRACT

An adhesive film including a first polymer comprising a first (meth)acrylate resin and at least one type of monomer represented by Chemical Formula 1; and a second polymer comprising a second (meth)acrylate resin. Also disclosed are a method for manufacturing the adhesive film and a foldable display device comprising the adhesive film.

12 Claims, 1 Drawing Sheet

(51) Int. Cl.
*C09J 7/10* (2018.01)
*C09J 7/40* (2018.01)
*G09F 9/30* (2006.01)

(52) U.S. Cl.
CPC ............ *C09J 7/40* (2018.01); *C08G 2170/00* (2013.01); *C09J 2203/318* (2013.01); *C09J 2301/20* (2020.08); *C09J 2301/30* (2020.08); *C09J 2433/00* (2013.01); *C09J 2479/086* (2013.01); *C09J 2483/006* (2013.01); *G09F 9/301* (2013.01)

(56) References Cited

U.S. PATENT DOCUMENTS

| | | | |
|---|---|---|---|
| 2015/0299534 A1* | 10/2015 | Yoshioka | ............... C09J 125/06 524/265 |
| 2017/0002237 A1 | 1/2017 | Cho et al. | |
| 2018/0215965 A1* | 8/2018 | Fukuhara | ............ H01L 21/6835 |
| 2020/0332153 A1 | 10/2020 | Park et al. | |

FOREIGN PATENT DOCUMENTS

| | | | |
|---|---|---|---|
| JP | 2008-115315 A | | 5/2008 |
| JP | 2010-132755 A | | 6/2010 |
| JP | 5087910 B | | 12/2012 |
| JP | 2013-032482 A | | 2/2013 |
| JP | 2018-154811 A | | 10/2018 |
| KR | 10-2015-0059127 A | | 5/2015 |
| KR | 10-2016-0083583 A | | 7/2016 |
| TW | 2019-27979 A | | 7/2019 |

\* cited by examiner

[FIG.1]
[FIG.2]
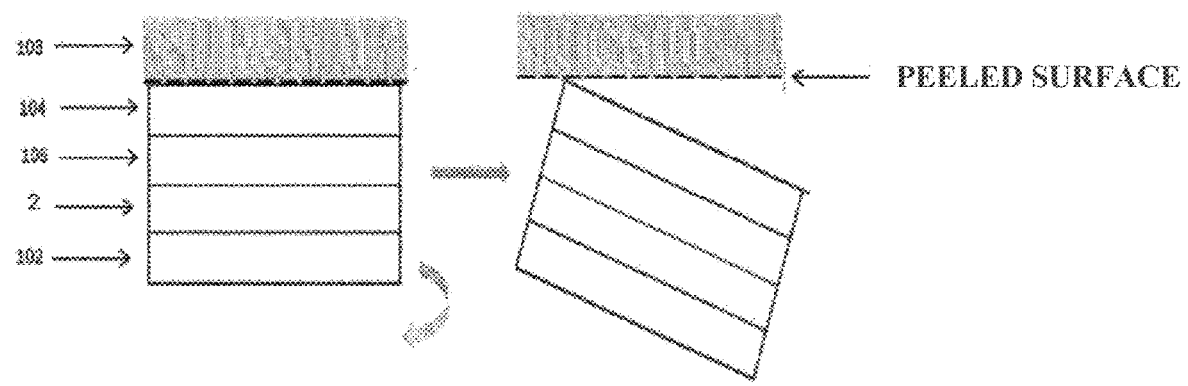
[FIG.3]
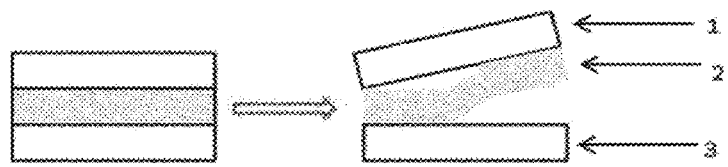

ADHESIVE FILM, METHOD FOR MANUFACTURING SAME, AND FOLDABLE DISPLAY DEVICE COMPRISING SAME

TECHNICAL FIELD

This application claims priority to and the benefits of Korean Patent Application No. 10-2019-0094795, filed with the Korean Intellectual Property Office on Aug. 5, 2019, the entire contents of which are incorporated herein by reference.

The present application relates to an adhesive film, a method for manufacturing the same, and a foldable display device comprising the same.

BACKGROUND OF THE INVENTION

With recent development of display-relating technologies, display devices transformable at the stage of use such as folding, rolling in a roll shape or stretching like a rubber band have been researched and developed. These displays may be transformed into various shapes, and therefore, may satisfy demands for both a larger display at the stage of use and a smaller display for portability.

In addition, portable terminals such as mobile communication terminals (wireless terminal), personal digital assistants (PDA), portable multimedia players (PMP) and electronic notebooks tend to be smaller in sizes for portability.

However, users want to receive information from various contents such as text information, videos and games through a screen of a portable terminal, and therefore require an enlarged or widened screen regarding the size of a display screen. However, satisfying both requirements has limits since a smaller portable terminal leads to a reduction in the size of a display screen.

Existing display devices have used non-transformable displays (unbreakable display), however, in order to overcome such limits, transformable displays, that is, curved displays, bended displays, foldable displays, rollable displays and the like have been developed.

A transformable display device may be transformed into various shapes in response to user demands or in accordance with needs of the situation in which the display device is used as well as transformed into shapes set in advance. Accordingly, the transformed shape of the display needs to be recognized, and the display device needs to be controlled in response to the recognized shape.

Meanwhile, a transformable display device has a problem in that each constitution of the display device may be damaged by transformation, and therefore, each constitution of such a display device needs to satisfy folding reliability and stability.

Particularly, an adhesive film used in a foldable display is designed to have low modulus for a function to relieve stress between layers during folding.

However, having low modulus increases stress relief applied when peeling a release film, and thereby has a problem of increasing release peel strength by requiring a greater force during the peeling.

In addition, existing adhesive films have a problem in that, with the passage of storage time, adhesive strength with a film protecting the adhesive film during storage such as a release film increases, and when used in a foldable display later, various defects caused by an increase in the adhesive strength occur in a process of peeling with the protective film.

Accordingly, in view of the above, development of an adhesive film capable of not only revealing sufficient adhesive strength and satisfying reliability during folding when used in a foldable display, but also preventing defects in a peeling process by suppressing an increase in the adhesive strength even when storing the adhesive film for a long period of time at room temperature has been required.

BRIEF DESCRIPTION OF THE INVENTION

The present application is directed to providing an adhesive film, a method for manufacturing the same, and a foldable display device comprising the same.

One embodiment of the present application provides an adhesive film comprising a first polymer comprising a first (meth)acrylate resin and one or more types of a monomer of the following Chemical Formula 1; and a second polymer comprising a second (meth)acrylate resin, wherein, after bonding one surface of the adhesive film to a first substrate, early peel strength after storing for 1 day at 23° C. is greater than 0 gf/inch and less than or equal to 10 gf/inch, and late peel strength after storing for 5 days at 40° C. is greater than 0 gf/inch and less than or equal to 10.5 gf/inch, the first substrate is a silicone-based substrate, and the adhesive film has a glass transition temperature (Tg) of higher than or equal to −90° C. and lower than or equal to −40° C.

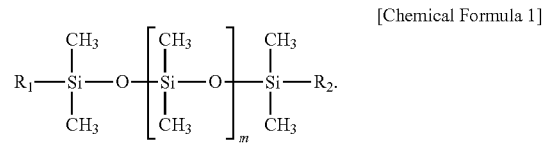

[Chemical Formula 1]

In Chemical Formula 1, $R_1$ is hydrogen; or an alkyl group, $R_2$ is a functional group comprising a (meth)acryloyl group, and m is an integer of 0 to 200.

Another embodiment provides a foldable display device comprising the adhesive film according to one embodiment of the present application.

Lastly, one embodiment of the present application provides a method for manufacturing an adhesive film, the method comprising preparing a first substrate; and forming an adhesive film by coating an adhesive composition on one surface of the first substrate, wherein the first substrate is a silicone-based substrate, the adhesive composition comprises a first polymer comprising a first (meth)acrylate resin and one or more types of a monomer of the following Chemical Formula 1; and a second polymer comprising a second (meth)acrylate resin, the adhesive film has a glass transition temperature (Tg) of higher than or equal to −90° C. and lower than or equal to −40° C., and a content of the monomer of Chemical Formula 1 is greater than or equal to 5 parts by weight and less than or equal to 95 parts by weight based on 100 parts by weight of the first polymer.

[Chemical Formula 1]

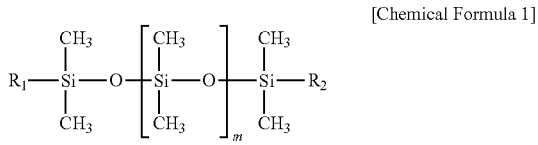

In Chemical Formula 1,
$R_1$ is hydrogen; or an alkyl group,
$R_2$ is a functional group comprising a (meth)acryloyl group, and
m is an integer of 0 to 200.

Advantageous Effects

An adhesive film according to one embodiment of the present application is capable of preventing an increase in peel strength even when storing for a long period of time at room temperature by comprising one or more types of a monomer of Chemical Formula 1 in the adhesive film, and defects such as tearing of the adhesive film in a peeling process can be prevented.

Particularly, the adhesive film according to the present application has a glass transition temperature (Tg) of the adhesive film satisfying the above-mentioned range, and by maintaining a low glass transition temperature, storage modulus is reduced leading to superior folding stability at a low temperature, and at the same time, release peel strength is designed to be low.

In addition, the adhesive film according to one embodiment of the present application has a glass transition temperature (Tg) of the adhesive film satisfying a specific range, and has an excellent interlayer stress relief function even though folding and unfolding are repeated at low temperature and room temperature when used in a foldable display later, and accordingly, damages on the display can be prevented in the foldable display.

Lastly, the adhesive film according to one embodiment of the present application has excellent adhesive strength for a cover window when used in a foldable display later, and accordingly, no delamination occurs even though folding and unfolding are repeated.

BRIEF DESCRIPTION OF DRAWINGS

FIG. 1 is a diagram illustrating an adhesive film according to one embodiment of the present application.
FIG. 2 is a diagram relating to a phenomenon occurring when peeling an existing adhesive film.
FIG. 3 is a diagram relating to a phenomenon occurring when peeling an existing adhesive film.

REFERENCE NUMERAL

101: Release Film
102: Adhesive Film
103: Suction Plate
104: Cover Window Protective Film
105: Cover Window
1: Light Peeling Release Film
2: Adhesive
3: Heavy Peeling Release Film

DETAILED DESCRIPTION OF THE INVENTION

Hereinafter, the present specification will be described in more detail.

In the present specification, a description of a certain part "including" certain constituents means capable of further including other constituents, and does not exclude other constituents unless particularly stated on the contrary.

Embodiments of the present disclosure will be described in detail with reference to accompanying drawings so that those having common knowledge in the art may readily implement the present disclosure. However, the present disclosure may be embodied in various different forms, and is not limited to the embodiments described herein.

One embodiment of the present application provides an adhesive film comprising a first polymer comprising a first (meth)acrylate resin and one or more types of a monomer of the following Chemical Formula 1; and a second polymer comprising a second (meth)acrylate resin, wherein, after bonding one surface of the adhesive film to a first substrate, early peel strength after storing for 1 day at 23° C. is greater than 0 gf/inch and less than or equal to 10 gf/inch, and late peel strength after storing for 5 days at 40° C. is greater than 0 gf/inch and less than or equal to 10.5 gf/inch, the first substrate is a silicone-based substrate, and, the adhesive film has a glass transition temperature (Tg) of higher than or equal to −90° C. and lower than or equal to −40° C.

[Chemical Formula 1]

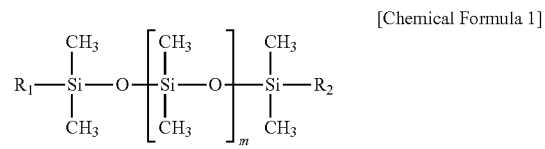

In Chemical Formula 1,
$R_1$ is hydrogen; or an alkyl group,
$R_2$ is a functional group comprising a (meth)acryloyl group, and
m is an integer of 0 to 200.

By comprising one or more types of the monomer of Chemical Formula 1 in the adhesive film, the adhesive film according to one embodiment of the present application is capable of preventing an increase in peel strength even when storing for a long period of time at room temperature, and may prevent defects such as tearing of the adhesive film in a peeling process of removing a protective film and the like when storing the adhesive film.

In one embodiment of the present application, the monomer of Chemical Formula 1 has a molecular form instead of particles, and may have a molecular weight of greater than or equal to 1,000 g/mol and less than or equal to 100,000 g/mol, and preferably greater than or equal to 5,000 g/mol and less than or equal to 10,000 g/mol.

In one embodiment of the present application, the monomer of Chemical Formula 1 has a liquid amorphous form at room temperature (20° C.), and a volume occupied by one unit molecule in an adhesive composition is very small, and the monomer may have a volume of less than approximately 3 nm when expressed as a numerical value.

In one embodiment of the present application, $R_1$ may be hydrogen.

In one embodiment of the present application, $R_1$ may be a methyl group.

In one embodiment of the present application, $R_1$ may be hydrogen; or an alkyl group having 1 to 30 carbon atoms.

In one embodiment of the present application, $R_2$ is a functional group comprising a (meth)acryloyl group, and the meaning of comprising a (meth)acryloyl group may mean a (meth)acryloyl group itself or may also mean having a (meth)acryloyl group as a functional group and capable of further comprising other organic groups.

In one embodiment of the present application, m may be an integer of 0 to 200.

In another embodiment, m may be an integer of greater than or equal to 1 and less than or equal to 200, preferably an integer of greater than or equal to 1 and less than or equal to 150, and more preferably an integer of greater than or equal to 1 and less than or equal to 50.

In the adhesive film provided in one embodiment of the present application, the adhesive film has a glass transition temperature (Tg) of higher than or equal to −90° C. and lower than or equal to −40° C.

In another embodiment, the adhesive film may have a glass transition temperature (Tg) of higher than or equal to −90° C. and lower than or equal to −40° C., preferably higher than or equal to −85° C. and lower than or equal to −40° C., and more preferably higher than or equal to −83° C. and lower than or equal to −60° C.

By the adhesive film one embodiment of the present application having a glass transition temperature in the above-mentioned range, cracks do not occur in a display even though folding and unfolding are repeated several times when used in the foldable display later. In other words, excellent reliability and stability are obtained even folding and unfolding a foldable display comprising the adhesive film according to the present application at low temperature (−20° C.) and room temperature (20° C.).

In other words, the adhesive film according to the present application has a glass transition temperature (Tg) of the adhesive film satisfying the above-mentioned range, and by maintaining a low glass transition temperature, storage modulus is reduced leading to superior folding stability at a low temperature, and at the same time, release peel strength is designed to be low.

In the present specification, the glass transition temperature is a value obtained using a differential scanning calorimeter (DSC, Mettler Toledo) by drawing temperature-dependent endothermic and exothermic amounts of a material resulting from a phase transition occurring when sealing a sample of approximately 10 mg in a dedicated pan and heating under a constant temperature raising environment.

Specifically, the glass transition temperature is a nominal value described in literatures, catalogs and the like, or a value calculated based on the following General Equation (1) (Fox equation).

$$1/Tg = W1/Tg1 + W2/Tg2 + \ldots + Wn/Tgn \quad \text{[General Equation (1)]}$$

In General Equation (1), Tg represents a glass transition temperature (unit: K) of Polymer A, Tgi (i=1, 2, . . . n) represents a glass transition temperature (unit: K) when Monomer i forms a homopolymer, and Wi (i=1, 2, . . . n) represents a mass fraction of Monomer i in all monomer components.

General Equation (1) means a calculation formula when Polymer A comprises n types of monomer components of Monomer 1, Monomer 2, . . . , Monomer n.

In one embodiment of the present application, early peel strength after bonding one surface of the adhesive film to a first substrate and storing for 1 day at 23° C. may be greater than 0 gf/inch and less than or equal to 10 gf/inch, and late peel strength after storing for 5 days at 40° C. may be greater than 0 gf/inch and less than or equal to 10.5 gf/inch.

The first substrate relates to a type of a usable release film, and is not limited as long as it is a commercially available silicone-based release film.

In one embodiment of the present application, the first substrate may be a substrate having surface energy of 35 mN/m or less.

In one embodiment of the present application, the first substrate may be a substrate having a surface water contact angle of 90° or greater.

In one embodiment of the present application, the first substrate may have surface energy of 35 mN/m or less, surface energy of 30 mN/m or less or surface energy of 25 mN/m or less, and the surface energy may satisfy a range of 5 mN/m or greater.

In one embodiment of the present application, the first substrate may have a surface water contact angle of 90° or greater, a surface water contact angle of 100° or greater or a surface water contact angle of 110° or greater, and the surface water contact angle may satisfy a range of 180° or less.

The early peel strength and the late peel strength are measured using a texture analyzer (Stable Micro Systems) at an angle of 180° and a peeling rate of 2400 mm/minute, and after cutting the adhesive film according to the present disclosure to a size of one inch, the film is attached to the first substrate by a 2 kg rubber roller going back and forth once, and the early peel strength and the late peel strength are each measured while peeling the adhesive film.

In other words, the early peel strength means a value measured using a texture analyzer (Stable Micro Systems) while peeling at an angle of 180° and a peeling rate of 2400 mm/minute after cutting the adhesive film according to the present disclosure to a size of one inch, then attaching the film to the first substrate by a 2 kg rubber roller going back and forth once, and storing for 1 day at 23° C. The late peel strength means a value measured using a texture analyzer (Stable Micro Systems) while peeling at an angle of 180° and a peeling rate of 2400 mm/minute after cutting the adhesive film according to the present disclosure to a size of one inch, then attaching the film to the first substrate by a 2 kg rubber roller going back and forth once, and storing for 5 days at 40° C.

In one embodiment of the present application, commercially available products having a thickness of greater than or equal to 30 μm and less than or equal to 100 μm may be used as the first substrate.

In one embodiment of the present application, the early peel strength after bonding one surface of the adhesive film to the first substrate and storing for 1 day at 23° C. may be 10 gf/inch or less, preferably 9.8 gf/inch or less, and more preferably 9.5 gf/inch or less.

In another embodiment, the early peel strength after bonding one surface of the adhesive film to the first substrate and storing for 1 day at 23° C. may be 1 gf/inch or greater, preferably 1.5 gf/inch or greater, and more preferably 2.0 gf/inch or greater.

In another embodiment, the early peel strength after bonding one surface of the adhesive film to the first substrate and storing for 1 day at 23° C. may be greater than or equal to 1 gf/inch and less than or equal to 10 gf/inch, preferably greater than or equal to 1.5 gf/inch and less than or equal to 9.8 gf/inch, and more preferably greater than or equal to 2.0 gf/inch and less than or equal to 9.5 gf/inch.

In one embodiment of the present application, the late peel strength after bonding one surface of the adhesive film to the first substrate and storing for 5 days at 40° C. may be 10.5 gf/inch or less, preferably 9 gf/inch or less, and more preferably 8.5 gf/inch or less.

In another embodiment, the late peel strength after bonding one surface of the adhesive film to the first substrate and storing for 5 days at 40° C. may be 1 gf/inch or greater, preferably 1.5 gf/inch or greater, and more preferably 2.0 gf/inch or greater.

In another embodiment, the late peel strength after bonding one surface of the adhesive film to the first substrate and storing for 5 days at 40° C. may be greater than or equal to 1 gf/inch and less than or equal to 10.5 gf/inch, preferably greater than or equal to 1.5 gf/inch and less than or equal to 9 gf/inch, and more preferably greater than or equal to 2.0 gf/inch and less than or equal to 8.5 gf/inch.

By comprising the monomer represented by Chemical Formula 1 in the first polymer, the adhesive film according to the present application may be stored while being attached to a protective film (silicone-based, expressed as the first substrate of the disclosure of the present application) fora long period of time before used in a foldable display, and by satisfying the ranges of the early peel strength and the late peel strength, the peel strength is maintained low even when storing for a long period of time at room temperature. Accordingly, defects such as tearing of the adhesive film do not occur even when removing the protective film (silicone-based, expressed as the first substrate of the disclosure of the present application) later in order to attach to the foldable display, and as a result, an adhesive film having excellent release peel strength may be obtained.

In the adhesive film provided in one embodiment of the present application, storage modulus (G1) at 20° C. and storage modulus (G2) at −20° C. satisfy the following Equation (A) and Equation (B) when measuring the adhesive film at a frequency of 1 Hz, 5% strain, and a temperature raising rate of 10° C./minute in a range of −20° C. to 90° C.

$1 \times 10^4 \, Pa \leq G1 \leq 9.5 \times 10^4 \, Pa$ [Equation (A)]

$G1 \leq G2 \leq 5.0 \times 10^5 \, Pa$ [Equation (B)]

When applying a sine-shaped shear deformation to an elastic body, stress has the same phase, whereas it is delayed by pi/2 in a Newtonian fluid, and in a viscoelastic material, stress is delayed in an intermediate form. When expressed mathematically, it may be expressed such that one component is in the same phase, and another component is delayed by pi/2. Herein, the part in the same phase is referred to as storage modulus, and the part delayed by pi/2 means loss modulus. In other words, the storage modulus means energy stored without loss due to elasticity.

In one embodiment of the present application, the storage modulus (G1 and G2) may be measured using ARES G2 (Advanced Rheometric Expansion System G2) of TA Instrument, and by measuring the adhesive film at a temperature raising rate of 5° C./min in a range of −20° C. to 250° C. under a condition of a frequency of 1 Hz in a shear mode, storage modulus (G1) at 20° C. may be measured, and storage modulus (G2) at −20° C. may be measured.

Specifically, the storage modulus (G1 and G2) may be measured using a parallel plate fixture having a diameter of 8 mm after overlapping the adhesive film according to the present application several times and cutting to a specimen having a thickness of 1 mm, and the measurement condition may be 1 Hz, 5% strain and 10° C./min.

In one embodiment of the present application, Equation (A) may be $1 \times 10^4 \, Pa \leq G1 \leq 9.5 \times 10^4 \, Pa$, preferably $2 \times 10^4 \, Pa \leq G1 \leq 7.5 \times 10^4 \, Pa$, and more preferably $2.9 \times 10^4 \, Pa \leq G1 \leq 6.0 \times 10^4 \, Pa$.

In one embodiment of the present application, the storage modulus (G2) at −20° C. may be $0.5 \times 10^5 \, Pa \leq G2 \leq 5.0 \times 10^5$ Pa, preferably $0.5 \times 10^5 \, Pa \leq G2 \leq 4.5 \times 10^5$ Pa, and more preferably $0.5 \times 10^5 \, Pa \leq G2 \leq 4.3 \times 10^5$ Pa.

In one embodiment of the present application, the first polymer may comprise the first (meth)acrylate resin and one or more types of the monomer of Chemical Formula 1.

In another embodiment, the first polymer may comprise the first (meth)acrylate resin and one or more and three or less types of the monomer of Chemical Formula 1.

In another embodiment, the first polymer may comprise the first (meth)acrylate resin and one type of the monomer of Chemical Formula 1.

In the first polymer comprising the first (meth)acrylate resin; and one or more types of the monomer of Chemical Formula 1, comprising the first (meth)acrylate resin; and one or more types of the monomer of Chemical Formula 1 may mean both comprising one polymer form by the first (meth)acrylate resin and one or more types of the monomer of Chemical Formula 1 bonding to each other, and comprising each of the first (meth)acrylate resin and the monomer of Chemical Formula 1.

In the adhesive film provided in one embodiment of the present application, adhesive strength after bonding one surface of the adhesive film to a second substrate and storing for 1 day at 23° C. is 500 gf/inch or greater, and the second substrate is a glass or polyimide (PI) substrate.

In another embodiment, adhesive strength after bonding one surface of the adhesive film to the second substrate and storing for 1 day at 23° C. may be 500 gf/inch or greater, preferably 600 gf/inch or greater, and more preferably 650 gf/inch or greater.

In another embodiment, adhesive strength after bonding one surface of the adhesive film to the second substrate and storing for 1 day at 23° C. may be 1500 gf/inch or less, preferably 1450 gf/inch or less, and more preferably 1430 gf/inch or less.

In another embodiment, adhesive strength after bonding one surface of the adhesive film to the second substrate and storing for 1 day at 23° C. may be greater than or equal to 500 gf/inch and less than or equal to 1500 gf/inch, preferably greater than or equal to 600 gf/inch and less than or equal to 1450 gf/inch, and more preferably greater than or equal to 650 gf/inch and less than or equal to 1430 gf/inch.

The adhesive strength means a value measured using a texture analyzer (Stable Micro Systems) while peeling at an angle of 180° and a peeling rate of 300 mm/minute after cutting the adhesive film according to the present disclosure to a size of one inch, then attaching the film to the second substrate by a 2 kg rubber roller going back and forth once, and storing for 1 day at 23° C.

As the adhesive film satisfies adhesive strength for the second substrate in the present application, peeling and delamination do not occur even though folding and unfolding are repeated several times when used in a foldable display, and excellent reliability is obtained in the foldable display.

In other words, by the composition and the content included in the adhesive film satisfying specific ranges, the adhesive film according to the present application may suppress an increase in peel strength fora release film (silicone substrate, expressed as the first substrate of the disclosure of the present application) in actual manufacturing and storing processes, and may have excellent adhesive strength when adhering to a cover window (expressed as the second substrate of the disclosure of the present application) of a flexible display later and used.

In the adhesive film provided in one embodiment of the present application, a rate of change in the peel strength represented by the following Equation (1) is greater than or equal to −10% and less than or equal to 20%.

$$[(B-A)/A] \times 100 \quad \text{[Equation (1)]}$$

In Equation (1),

A means the early peel strength, and

B means the late peel strength.

In another embodiment, the rate of change in the peel strength represented by Equation (1) may be greater than or equal to −10% and less than or equal to 20%, preferably greater than or equal to −8% and less than or equal to 15%, and more preferably greater than or equal to −7.5% and less than or equal to 10%.

By the rate of change in the peel strength represented by Equation (1) satisfying the above-mentioned range, the adhesive film according to the present application has a smaller increase in the peel strength, and therefore, prevents defects such as tearing of the adhesive film even when removing a protective film (silicone-based) to attach to a foldable display later.

In the adhesive film provided in one embodiment of the present application, the first polymer has a weight average molecular weight of greater than or equal to 10,000 g/mol and less than or equal to 100,000 g/mol.

By the weight average molecular weight of the first polymer satisfying the above-mentioned range, the adhesive film is readily manufactured, and the adhesive film comprising the same has an increased internal cohesive strength leading to favorable properties of recovery when folding/unfolding, and the adhesive film comprising the same has excellent durability even at high temperature.

The weight average molecular weight is one of average molecular weights in which molecular weights are not uniform and a molecular weight of a certain polymer material is used as a base, and it is a value obtained by averaging molecular weights of component molecular species of a polymer compound having molecular weight distribution.

The weight average molecular weight may be measured through a gel permeation chromatography (GPC) analysis.

In one embodiment of the present application, the (meth)acrylate described in the first (meth)acrylate resin means comprising both an acrylate and a methacrylate. Examples of the (meth)acrylate-based resin may comprise a copolymer of a (meth)acrylic acid ester-based monomer and a crosslinkable functional group-containing monomer.

The copolymer means a polymer obtained by polymerizing two or more types of different units, and the copolymer may have the two or more types of units arranged irregularly or regularly.

The copolymer may be a random copolymer in which monomers are mixed with other without regularity, a block Copolymer in which arranged blocks are repeated by a certain section, or an alternating copolymer having a form in which monomers are alternately arranged and polymerized.

The (meth)acrylic acid ester-based monomer is not particularly limited, however, examples thereof may comprise an alkyl (meth)acrylate, and more specifically, a monomer having an alkyl group with 1 to 30 carbon atoms and comprising an ether as a linking group in the monomer, and may comprise one, two or more types of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate, decyl (meth)acrylate and carbitol (meth)acrylate.

The crosslinkable functional group-containing monomer is not particularly limited, however, examples thereof may comprise one, two or more types of a hydroxyl group-containing monomer, a carboxyl group-containing monomer and a nitrogen-containing monomer.

Examples of the hydroxyl group-containing monomer may comprise 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate or the like.

Examples of the carboxyl group-containing monomer may comprise b-carboxyethyl (meth)acrylate, (meth)acrylic acid, 2-(meth)acryloyloxyacetic acid, 3-(meth)acryloyloxypropionic acid, 4-(meth)acryloyloxybutyric acid, an acrylic acid dimer, itaconic acid, maleic acid, maleic anhydride or the like.

Examples of the nitrogen-containing monomer may comprise (meth)acrylonitrile, N-vinyl pyrrolidone, N-vinyl caprolactam or the like.

In terms of enhancing other functionalities such as compatibility, at least one of vinyl acetate, styrene and acrylonitrile may be further copolymerized to the (meth)acrylate-based resin.

In one embodiment of the present application, the first (meth)acrylate resin may be a copolymer of an alkyl (meth)acrylate-based resin.

In one embodiment of the present application, the first (meth)acrylate resin may be a copolymer of an alkyl acrylate-based resin.

In one embodiment of the present application, the first (meth)acrylate resin may be a copolymer of one or more types selected from the group consisting of ethylhexyl acrylate and butyl acrylate.

In one embodiment of the present application, the first (meth)acrylate resin may be included in 50 parts by weight to 95 parts by weight based on 100 parts by weight of the first polymer.

In another embodiment, the first (meth)acrylate resin may be included in 50 parts by weight to 95 parts by weight, preferably in 50 parts by weight to 90 parts by weight, and more preferably in 50 parts by weight to 85 parts by weight based on 100 parts by weight of the first polymer.

The first (meth)acrylate resin included in the first polymer of the adhesive film of the present application has the above-described composition and content, and particularly by using with the monomer of Chemical Formula 1 in a specific content, an excellent interlayer stress relief function is obtained by satisfying the range of Equation (1) even though folding and unfolding are repeated when used in a foldable display later, and accordingly, damages on the display may be prevented in the foldable display.

In the adhesive film provided in one embodiment of the present application, the adhesive film further comprises a second polymer comprising a second (meth)acrylate resin.

In one embodiment of the present application, the second (meth)acrylate resin may be a copolymer of an alkyl (meth)acrylate-based resin and a crosslinkable functional group-containing monomer.

In one embodiment of the present application, the crosslinkable functional group-containing monomer of the second (meth)acrylate may be one or more types selected from the group consisting of a hydroxyl group-containing monomer and a carboxyl group-containing monomer.

In another embodiment, the crosslinkable functional group-containing monomer of the second (meth)acrylate resin may be one or more types selected from the group consisting of (meth)acrylic acid, b-carboxyethyl (meth)acrylate and 4-hydroxybutyl (meth)acrylate.

In another embodiment, the crosslinkable functional group-containing monomer of the second (meth)acrylate resin may be one or more types selected from the group consisting of acrylic acid, b-carboxyethyl acrylate and 4-hydroxybutyl acrylate.

In one embodiment of the present application, the second (meth)acrylate resin may be included in 85 parts by weight to 99 parts by weight based on 100 parts by weight of the second polymer.

In another embodiment, the second (meth)acrylate resin may be included in 85 parts by weight to 99 parts by weight, preferably in 87 parts by weight to 99 parts by weight, and more preferably in 90 parts by weight to 99 parts by weight based on 100 parts by weight of the second polymer.

In one embodiment of the present application, the alkyl (meth)acrylate-based resin included in the second (meth)acrylate resin may comprise one, two or more types of n-butyl (meth)acrylate, 2-ethylhexyl (meth)acrylate, carbitol (meth)acrylate and dodecyl (meth)acrylate.

In one embodiment of the present application, the alkyl (meth)acrylate-based resin may be included in greater than or equal to 70 parts by weight and less than or equal to 99 parts by weight, and preferably in greater than or equal to 75 parts by weight and less than or equal to 98.5 parts by weight based on 100 parts by weight of the second (meth)acrylate resin.

In one embodiment of the present application, the alkyl (meth)acrylate-based resin included in the second (meth)acrylate resin may comprise one or more selected from the group consisting of an alkyl (meth)acrylate having 1 to 10 carbon atoms; and an alkyl (meth)acrylate having 11 to 30 carbon atoms.

In another embodiment, the alkyl (meth)acrylate-based resin included in the second (meth)acrylate resin may comprise an alkyl (meth)acrylate having 1 to 10 carbon atoms.

In another embodiment, the alkyl (meth)acrylate-based resin included in the second (meth)acrylate resin may comprise an alkyl (meth)acrylate having 1 to 10 carbon atoms; and an alkyl (meth)acrylate having 11 to 30 carbon atoms.

In one embodiment of the present application, the alkyl (meth)acrylate having 1 to 10 carbon atoms may comprise a linear or branched alkyl (meth)acrylate having 1 to 10 carbon atoms; or a cycloalkyl (meth)acrylate having 3 to 10 carbon atoms.

In one embodiment of the present application, the alkyl (meth)acrylate having 1 to 10 carbon atoms may comprise one or more selected from the group consisting of methyl (meth)acrylate; ethyl (meth)acrylate, n-propyl (meth)acrylate; isopropyl (meth)acrylate; n-butyl (meth)acrylate; t-butyl (meth)acrylate; isobutyl (meth)acrylate; 2-ethylhexyl (meth)acrylate; 2-ethylbutyl (meth)acrylate; pentyl (meth)acrylate; hexyl (meth)acrylate; cyclohexyl (meth)acrylate; n-octyl (meth)acrylate; isooctyl (meth)acrylate; isononyl (meth)acrylate; decyl (meth)acrylate; and carbitol (meth)acrylate, but is not limited thereto as long as it satisfies the range of the number of carbon atoms of the alkyl group.

In one embodiment of the present application, the alkyl (meth)acrylate having 1 to 10 carbon atoms may preferably comprise a linear or branched alkyl (meth)acrylate having 1 to 10 carbon atoms.

In one embodiment of the present application, the alkyl (meth)acrylate having 1 to 10 carbon atoms may be 2-ethylhexyl (meth)acrylate (EHA); butyl (meth)acrylate (BA); or hexyl (meth)acrylate, and may be particularly preferably 2-ethylhexyl (meth)acrylate (EHA); or butyl (meth)acrylate (BA).

In one embodiment of the present application, the alkyl (meth)acrylate having 11 to 30 carbon atoms may comprise a linear or branched alkyl (meth)acrylate having 1 to 10 carbon atoms; or a cycloalkyl (meth)acrylate having 3 to 30 carbon atoms.

In one embodiment of the present application, the alkyl (meth)acrylate having 11 to 30 carbon atoms may be dodecyl (meth)acrylate; tridecyl (meth)acrylate; tetradecyl (meth)acrylate; or octadecyl(meth)acrylate, but is not limited thereto as long as it satisfies the range of the number of carbon atoms of the alkyl group.

In one embodiment of the present application, the alkyl (meth)acrylate having 11 to 30 carbon atoms may comprise a linear or branched alkyl (meth)acrylate having 11 to 30 carbon atoms.

Particularly preferably, the alkyl (meth)acrylate having 11 to 30 carbon atoms of the present application may be dodecyl (meth)acrylate (LA, lauryl (meth)acrylate).

In one embodiment of the present application, the alkyl (meth)acrylate having 1 to 10 carbon atoms may be included in greater than or equal to 40 parts by weight and less than or equal to 99 parts by weight based on 100 parts by weight of the alkyl (meth)acrylate-based resin included in the second (meth)acrylate.

In another embodiment, when the alkyl (meth)acrylate-based resin included in the second (meth)acrylate resin includes an alkyl (meth)acrylate having 1 to 10 carbon atoms, the alkyl (meth)acrylate having 1 to 10 carbon atoms may be included in 80 parts by weight or greater, preferably in 90 parts by weight or greater and more preferably in 95 parts by weight or greater, and may be included in 99 parts by weight or less and preferably in 98 parts by weight or less based on 100 parts by weight of the alkyl (meth)acrylate-based resin.

In one embodiment of the present application, the alkyl (meth)acrylate having 1 to 10 carbon atoms may be included in greater than or equal to 20 parts by weight and less than or equal to 80 parts by weight; and the alkyl (meth)acrylate having 11 to 30 carbon atoms may be included in greater than or equal to 10 parts by weight and less than or equal to 60 parts by weight based on 100 parts by weight of the alkyl (meth)acrylate-based resin included in the second (meth) acrylate.

In another embodiment, when the alkyl (meth)acrylate-based resin included in the second (meth)acrylate includes an alkyl (meth)acrylate having 1 to 10 carbon atoms; and an alkyl (meth)acrylate having 11 to 30 carbon atoms, the alkyl (meth)acrylate having 1 to 10 carbon atoms may be included in 20 parts by weight or greater, preferably in 30 parts by weight or greater, more preferably in 35 parts by weight or greater and particularly preferably in 40 parts by weight or greater, and may be included in 80 parts by weight or less, preferably in 70 parts by weight or less, more preferably in 65 parts by weight or less and particularly preferably in 60 parts by weight or less based on 100 parts by weight of the alkyl (meth)acrylate-based resin, and the alkyl (meth)acrylate having 11 to 30 carbon atoms may be included in 10 parts by weight or greater, preferably in 15 parts by weight or greater and more preferably in 20 parts by weight or greater, and may be included in 60 parts by weight or less, preferably in 50 parts by weight or less, more preferably in 45 parts by weight or less and particularly preferably in 40 parts by weight or less based on 100 parts by weight of the alkyl (meth)acrylate-based resin.

In the present application, comprising the alkyl (meth) acrylate group means comprising one, two or more types thereof regardless of the type as long as it satisfies the range of the number of carbon atoms of the alkyl group included in the alkyl (meth)acrylate.

In the adhesive film of the present application, the alkyl (meth)acrylate-based resin included in the second (meth) acrylate resin comprises an alkyl (meth)acrylate having 1 to 10 carbon atoms as a base, and when comprising the same, a storage modulus value is reduced by lowering a glass transition temperature (Tg) of the adhesive film included in the adhesive film of the present application, and accordingly, excellent folding/unfolding properties are obtained when used in a foldable display later.

In addition, in one embodiment of the present application, the alkyl (meth)acrylate-based resin included in the second (meth)acrylate may comprise an alkyl (meth)acrylate having 1 to 10 carbon atoms; and an alkyl (meth)acrylate having 11 to 30 carbon atoms.

When the alkyl (meth)acrylate-based resin included in the second (meth)acrylate further comprises an alkyl (meth) acrylate having 11 to 30 carbon atoms while comprising an alkyl (meth)acrylate having 1 to 10 carbon atoms as a base in the adhesive film of the present application, storage modulus at a low temperature of $-20°$ C. may be particularly effectively lowered while lowering a glass transition temperature (Tg) of the adhesive film included in the adhesive film of the present application, and accordingly, an excellent interlayer stress relief function is obtained even though folding and unfolding are repeated at low temperature and room temperature when used in a foldable display.

In one embodiment of the present application, the crosslinkable functional group-containing monomer may be included in greater than or equal to 1 parts by weight and less than or equal to 30 parts by weight, and preferably in greater than or equal to 1 parts by weight and less than or equal to 25 parts by weight based on 100 parts by weight of the second (meth)acrylate.

In one embodiment of the present application, the second (meth)acrylate may be a copolymer of an alkyl (meth) acrylate-based resin and a hydroxyl group-containing monomer; or a copolymer of an alkyl (meth)acrylate-based resin and a carboxyl group-containing monomer.

In one embodiment of the present application, when the second (meth)acrylate is a copolymer of an alkyl (meth) acrylate-based resin and a carboxyl group-containing monomer, the carboxyl group-containing monomer may be included in greater than or equal to 1 parts by weight and less than or equal to 10 parts by weight, and preferably in greater than or equal to 1 parts by weight and less than or equal to 5 parts by weight based on 100 parts by weight of the second (meth)acrylate.

In one embodiment of the present application, when the second (meth)acrylate is a copolymer of an alkyl (meth) acrylate-based resin and a hydroxyl group-containing monomer, the hydroxyl group-containing monomer may be included in greater than or equal to 5 parts by weight and less than or equal to 30 parts by weight, and preferably in greater than or equal to 10 parts by weight and less than or equal to 25 parts by weight based on 100 parts by weight of the second (meth)acrylate.

When the amount of the crosslinkable functional group-containing monomer is included in the above-mentioned range as above, adhesive strength is superior when attached to the substrate later, and a storage modulus value is formed in a proper range by properly maintaining a Tg value, and as a result, problems such as delamination when folding/unfolding do not occur.

The adhesive film of the present application comprises the second polymeras a base resin with the first polymer, and by the second (meth)acrylate included in the second polymer having the above-described composition and content and by particularly comprising the monomer having a specific functional group in the above-mentioned content, an excellent interlayer stress relief function is obtained by satisfying the range of Equation (1) even though folding and unfolding are repeated when used in a foldable display later, and accordingly, damages on the display may be prevented in the foldable display.

In the adhesive film provided in one embodiment of the present application, a content of the first polymer is greater than or equal to 0.01 parts by weight and less than or equal to 5 parts by weight based on 100 parts by weight of the second polymer.

In the adhesive film provided in one embodiment of the present application, a content of the monomer of Chemical Formula 1 is greater than or equal to 5 parts by weight and less than or equal to 95 parts by weight based on 100 parts by weight of the first polymer.

In another embodiment, a content of the monomer of Chemical Formula 1 may be greater than or equal to 5 parts by weight and less than or equal to 95 parts by weight, preferably greater than or equal to 10 parts by weight and less than or equal to 80 parts by weight, and more preferably greater than or equal to 20 parts by weight and less than or equal to 60 parts by weight based on 100 parts by weight of the first polymer.

By comprising the monomer represented by Chemical Formula 1 in the above-mentioned content range in the adhesive film of the present application, early peel strength and late peel strength for the silicone substrate satisfy specific ranges, and properties of suppressing changes in the release peel strength may be obtained.

In the adhesive film provided in embodiment of the present application, a first substrate is further included on one surface of the adhesive film; or both surfaces of the adhesive film.

In one embodiment of the present application, the first substrate may be expressed as a silicone-based release film.

In the adhesive film provided in one embodiment of the present application, a first substrate is included in one surface of the adhesive film, and a substrate film is included on a surface opposite to the surface in contact with the first substrate of the adhesive film.

In one embodiment of the present application, the substrate film may be selected from the group consisting of polyethylene terephthalate (PET), polyester, polycarbonate (PC), polyimide (PI), polyethylene naphthalate (PEN), polyether ether ketone (PEEK), polyarylate (PAR), polycycloolefin (PCO), polynorbornene, polyethersulphone (PES) and cycloolefin polymer (COP).

In one embodiment of the present application, the substrate film may have a thickness of greater than or equal to 25 μm and less than or equal to 300 μm, preferably greater than or equal to 30 μm and less than or equal to 270 μm, and more preferably greater than or equal to 40 μm and less than or equal to 250 μm.

In addition, the substrate film is preferably transparent. The substrate film being transparent herein means having visible light (400 nm to 700 nm) transmittance of 80% or greater.

In the adhesive film provided in one embodiment of the present application, a first substrate is further included on both surface of the adhesive film.

In one embodiment of the present application, the first substrate may be expressed as a silicone-based release film.

As the silicone-based release film, a hydrophobic film may be used. It is a layer for protecting a very thin adhesive sheet and refers to a transparent layer attached on one surface of the adhesive sheet, and films having excellent mechanical strength, thermal stability, moisture barrier properties, isotropy and the like may be used. For example, acetate-based such as triacetyl cellulose (TAC), polyester-based, polyethersulphone-based, polycarbonate-based, polyamide-based, polyimide-based, polyolefin-based, cycloolefin-based, polyurethane-based and acryl-based resin films, and the like, may be used, however, the release film is not limited thereto as long as it is a commercially available silicone-treated release film.

In the adhesive film provided in one embodiment of the present application, the adhesive film may have a thickness of greater than or equal to 5 μm and less than or equal to 100 μm.

The release film may all be removed when used in a foldable display later.

One embodiment of the present application provides an adhesive composition comprising a first polymer comprising a first (meth)acrylate resin and one or more types of a monomer of the following Chemical Formula 1; and a second polymer comprising a second (meth)acrylate resin, wherein a content of the monomer of Chemical Formula 1 is greater than or equal to 5 parts by weight and less than or equal to 95 parts by weight based on 100 parts by weight of the first polymer.

[Chemical Formula 1]

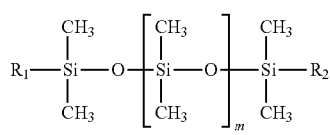

In Chemical Formula 1, $R_1$ is hydrogen; or an alkyl group, $R_2$ is a functional group comprising a (meth)acrylate group, and m is an integer of 0 to 200.

In the adhesive composition of one embodiment of the present application comprising a first polymer comprising a first (meth)acrylate resin and one or more types of a monomer of Chemical Formula 1; and a second polymer comprising a second (meth)acrylate resin, early peel strength after coating the adhesive composition on a first substrate and storing for 1 day at 23° C. may be greater than 0 gf/inch and less than or equal to 10 gf/inch, and late peel strength after storing for 5 days at 40° C. may be greater than 0 gf/inch and less than or equal to 10.5 gf/inch.

In the adhesive composition of one embodiment of the present application comprising a first polymer comprising a first (meth)acrylate resin and one or more types of a monomer of Chemical Formula 1; and a second polymer comprising a second (meth)acrylate resin, adhesive strength after coating the adhesive composition on a second substrate and storing for 1 day at 23° C. may be 500 gf/inch or greater.

In the adhesive composition, descriptions on the first substrate and the second substrate are the same as the descriptions provided above.

In one embodiment of the present application, the adhesive composition may further comprise one or more selected from the group consisting of a solvent, a dispersant, a photoinitiator, a thermal initiator, a crosslinking agent and a tackifier.

As the dispersant and the tackifier, materials generally used in the art may be used without limit.

As the solvent, generally used organic solvents may be used, and toluene, ethyl acetate or the like may be used. A polar aprotic solvent may be used, and specifically, methyl ethyl ketone may be used.

According to one embodiment of the present specification, the crosslinking agent may comprise one or more types selected from the group consisting of a compound obtained by esterifying a polyalcohol such as hexanediol di(meth)acrylate, ethylene glycol di(meth)acrylate, polyethylene glycol di(meth)acrylate having 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethylphthalic acid, propylene glycol di(meth)acrylate having 2 to 14 propylene groups, dipentaerythritol penta(meth)acrylate, dipentaerythritol hexa(meth)acrylate or a mixture of an acidic modification of dipentaerythritol penta(meth)acrylate and dipentaerythritol hexa(meth)acrylate (TO-2348, TO-2349 of TOAGOSEI Co., Ltd. as a product name) with α,β-unsaturated carboxylic acid; a compound obtained by adding (meth)acrylic acid to a compound containing a glycidyl group such as a trimethylolpropane triglycidyl ether acrylic acid adduct or a bisphenol A diglycidyl ether acrylic acid adduct; an ester compound of a compound having a hydroxyl group or an ethylenic unsaturated bond and a polycarboxylic acid, or an adduct with polyisocyanate such as a phthalic acid diester of 3-hydroxyethyl(meth)acrylate or a toluene diisocyanate adduct of 3-hydroxyethyl (meth)acrylate; a (meth)acrylic acid alkyl ester such as methyl (meth)acrylate, ethyl (meth)acrylate, butyl (meth)acrylate or 2-ethylhexyl (meth)acrylate; and 9,9'-bis[4-(2-acryloyloxyethoxy)phenyl]fluorene. However, the crosslinking agent is not limited thereto, and general materials known in the art may be used.

In one embodiment of the present application, the crosslinking agent may be included in greater than or equal to 0.001 parts by weight and less than or equal to 1 parts by weight based on 100 parts by weight of the adhesive composition.

In another embodiment, the crosslinking agent may be included in greater than or equal to 0.001 parts by weight and less than or equal to 1 parts by weight, preferably in greater than or equal to 0.003 parts by weight and less than or equal to 0.1 parts by weight, and more preferably in greater than or equal to 0.004 parts by weight and less than or equal to 0.08 parts by weight based on 100 parts by weight of the adhesive composition.

In one embodiment of the present application, one or more crosslinking agents selected from the group consisting of an epoxy-based crosslinking agent and an isocyanate-based crosslinking agent may be included as the crosslinking agent.

In one embodiment of the present application, at least one of the crosslinking agents may comprise an isocyanate-based crosslinking agent.

In one embodiment of the present application, the isocyanate-based crosslinking agent may be included in greater than or equal to 0.001 parts by weight and less than or equal to 0.1 parts by weight, and preferably in greater than or equal to 0.005 parts by weight and less than or equal to 0.09 parts by weight based on 100 parts by weight of the adhesive composition.

According to one embodiment of the present specification, the photoinitiator may be substituted with one, two or more substituents selected from the group consisting of a triazine-based compound, a biimidazole compound, an acetophenone-based compound, an O-acyloxime-based compound, a thioxanthone-based compound, a phosphine oxide-based compound, a coumarin-based compound and a benzophenone-based compound.

Specifically, according to one embodiment of the present specification, the photoinitiator may use a triazine-based compound such as 2,4-trichloromethyl-(4'-methoxyphenyl)-6-triazine, 2,4-trichloromethyl-(4'-methoxystyryl)-6-triazine, 2,4-trichloromethyl-(piperonyl)-6-triazine, 2,4-trichloromethyl-(3',4'-dimethoxyphenyl)-6-triazine, 3-{4-[2,4-bis(trichloromethyl)-s-triazin-6-yl]phenylthio}propanoic acid, 2,4-trichloromethyl-(4'-ethylbiphenyl)-6-triazine or 2,4-trichloromethyl-(4'-methylbiphenyl)-6-triazine; a biimidazole-based compound such as 2,2'-bis(2-chlorophenyl)-4,4',5,5'-tetraphenylbiimidazole or 2,2'-bis(2,3-dichlorophenyl)-4,4',5,5'-tetraphenylbiimidazole; an acetophenone-based compound such as 2-hydroxy-2-methyl-1-phenylpropan-1-one, 1-(4-isopropylphenyl)-2-hydroxy-2-methylpropan-1-one, 4-(2-hydroxyethoxy)-phenyl (2-hydroxy)propyl ketone, 1-hydroxycyclohexyl phenyl ketone, 2,2-dimethoxy-2-phenyl acetophenone, 2-methyl-(4-methylthiophenyl)-2-morpholino-1-propan-1-one (Irgacure-907) or 2-benzyl-2-dimethylamino-1-(4-morpholinophenyl)-butan-1-one (Irgacure-369); an O-acyloxime-based compound such as Irgacure OXE 01 or Irgacure OXE 02 of Ciba Geigy Ltd.; a benzophenone-based compound such as 4,4'-bis(dimethylamino)benzophenone or 4,4'-bis(diethylamino)benzophenone; a thioxanthone-based compound such as 2,4-diethyl thioxanthone, 2-chloro thioxanthone, isopropyl thioxanthone or diisopropyl thioxanthone; a phosphine oxide-based compound such as 2,4,6-trimethylbenzoyl diphenylphosphine oxide, bis(2,6-dimethoxybenzoyl)-2,4,4-trimethylpentyl phosphine oxide or bis(2,6-dichlorobenzoyl)propyl phosphine oxide; a coumarin-based compound such as 3,3'-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin or 10,10'-carbonylbis[1,1,7,7-tetramethyl-2,3,6,7-tetrahydro-1H,5H,11H—Cl]-benzopyrano[6,7,8-ij]-quinolizin-11-one, or the like either alone or as a mixture of two or more thereof, however, the photoinitiator is not limited thereto.

In addition, as the thermal initiator, those known in the art may be used.

One embodiment of the present application provides a foldable display device comprising the adhesive film according to the present application.

In one embodiment of the present application, the adhesive film according to the present application may be used in a foldable display device, and may be used in all places where an adhesive film is used such as a cover and a back plate of a foldable display device.

FIG. 2 is a diagram relating to a phenomenon occurring when peeling an existing adhesive film. Specifically, a cover window (105) itself is a flexible polyimide substrate or a thin glass substrate, and after placing on a suction plate (103), there is a problem in that, during a process of removing a release film (101) attached to an adhesive (2), peel strength is high due to an increase in the adhesive strength resulting in peeling of an uppermost cover window protective film (104) and the suction plate (103), or the cover window protective film (104) being peeled from the cover window (105).

FIG. 3 is also a diagram relating to a phenomenon occurring when peeling an existing adhesive film. Specifically, in a double-sided release film structure (light peeling/heavy peeling release film lamination), it is identified that release peel strength increases more when peeling a light peeling release film (1) compared to a heavy peeling release film (3), and an adhesive (2) is torn in the middle.

However, in the adhesive film according to one embodiment of the present application, the glass transition temperature value of the adhesive film satisfies a specific range by controlling compositions and contents included in the adhesive film to specific ranges, and accordingly, an increase in the adhesive strength between the adhesive film and a release film (silicone-based) may be prevented, and the problems described above do not occur during a process of peeling the release film.

One embodiment of the present application provides a method for manufacturing an adhesive film, the method comprising preparing a first substrate; and forming an adhesive film by coating an adhesive composition on one surface of the first substrate,
wherein the first substrate is a silicone-based substrate,
the adhesive composition comprises a first polymer comprising a first (meth)acrylate resin and one or more types of a monomer of the following Chemical Formula 1; and a second polymer comprising a second (meth)acrylate resin,
the adhesive film has a glass transition temperature (Tg) of higher than or equal to −90° C. and lower than or equal to −40° C., and
a content of the monomer of Chemical Formula 1 is greater than or equal to 5 parts by weight and less than or equal to 95 parts by weight based on 100 parts by weight of the first polymer.

[Chemical Formula 1]

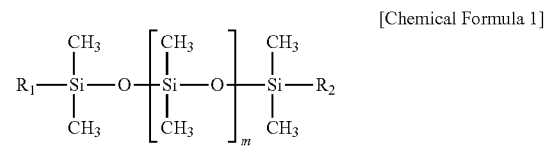

In Chemical Formula 1,
$R_1$ is hydrogen; or an alkyl group,
$R_2$ is a functional group comprising a (meth)acryloyl group, and
m is an integer of 0 to 200.

In the method for manufacturing an adhesive film provided in one embodiment of the present application, the forming of an adhesive film by coating an adhesive composition on one surface of the first substrate further comprises drying after coating the adhesive composition.

The drying means drying the adhesive composition for 3 minutes at 140° C. using a Mathis oven.

The method for manufacturing an adhesive film provided in one embodiment of the present application further comprises bonding one surface of the adhesive film to a second substrate after the forming of an adhesive film by coating an adhesive composition on one surface of the first substrate,
wherein the second substrate is a glass or polyimide (PI) substrate, and adhesive strength after bonding one surface of the adhesive film to the second substrate and storing for 1 day at 23° C. is 500 gf/inch or greater.

The method for manufacturing an adhesive film provided in one embodiment of the present application further comprises removing the first substrate after the forming of an adhesive film by coating an adhesive composition on one surface of the first substrate, wherein peel strength for the surface in contact with the first substrate of the adhesive film is greater than 0 gf/inch and less than or equal to 10 gf/inch in the removing of the first substrate.

Hereinafter, the present disclosure will be described in detail with reference to examples so that those having common knowledge in the art may readily implement the present disclosure. However, the present disclosure may be embodied in various different forms, and is not limited to the examples described herein.

Preparation Example

1. Preparation of Polymer

To a 1 L reactor in which nitrogen gas is refluxed and a cooling device is installed so as to readily control a temperature, a monomer mixture formed as described in the following Table 1 was introduced, and ethyl acetate (EAc) was introduced thereto as a solvent.

After that, the reactor was purged with nitrogen gas for approximately 1 hour to remove oxygen, and the reactor temperature was maintained at 62° C. After making the mixture uniform, 400 ppm of azobisisobutyronitrile (AIBN) as a reaction initiator and 400 ppm of n-dodecylmercaptan (n-DDM) as a chain transfer agent were introduced thereto, and the mixture was reacted.

After the reaction, the result was diluted with EAc to prepare each polymer of the following Table 1.

duced to the second polymer (100 g) described in the following Table 2, and the mixture was uniformly mixed to prepare each adhesive composition. Types of the used polymer are as shown in the following Table 2.

TABLE 2

| | | Resin Type | |
|---|---|---|---|
| | Crosslinking Agent | First polymer | Second polymer |
| Example 1 | BXX-5240 0.03 pt/ BXX-5627 0.005 pt | Polymer 8 0.1 pt | Polymer 1 99.9 pt |
| Example 2 | BXX-5240 0.03 pt/ BXX-5627 0.005 pt | Polymer 8 0.05 pt | Polymer 1 99.95 pt |
| Example 3 | BXX-5240 0.03 pt/ BXX-5627 0.005 pt | Polymer 9 0.1 pt | Polymer 1 99.9 pt |
| Example 4 | BXX-5240 0.03 pt/ BXX-5627 0.005 pt | Polymer 9 0.3 pt | Polymer 1 99.7 pt |
| Example 5 | TKA-100 0.07 pt | Polymer 8 0.1 pt | Polymer 2 99.9 pt |
| Example 6 | TKA-100 0.07 pt | Polymer 9 0.1 pt | Polymer 2 99.9 pt |
| Example 7 | TKA-100 0.07 pt | Polymer 8 0.1 pt | Polymer 3 99.9 pt |
| Example 8 | TKA-100 0.07 pt | Polymer 9 0.1 pt | Polymer 3 99.9 pt |
| Example 9 | BXX-5240 0.03 pt/ BXX-5627 0.005 pt | Polymer 8 0.1 pt | Polymer 4 99.9 pt |
| Example 10 | BXX-5240 0.03 pt/ BXX-5627 0.005 pt | Polymer 9 0.1 pt | Polymer 4 99.9 pt |
| Example 11 | BXX-5240 0.03 pt/ BXX-5627 0.005 pt | Polymer 10 0.1 pt | Polymer 4 99.9 pt |
| Comparative Example 1 | BXX-5240 0.03 pt/ BXX-5627 0.005 pt | — | Polymer 1 100 pt |
| Comparative Example 2 | TKA-100 0.07 pt | — | Polymer 2 100 pt |
| Comparative Example 3 | TKA-100 0.07 pt | — | Polymer 3 100 pt |
| Comparative Example 4 | BXX-5240 0.03 pt/ BXX-5627 0.005 pt | — | Polymer 5 100 pt |
| Comparative Example 5 | BXX-5240 0.03 pt/ BXX-5627 0.005 pt | — | Polymer 6 100 pt |
| Comparative Example 6 | BXX-5240 0.03 pt/ BXX-5627 0.005 pt | — | Polymer 7 100 pt |

The adhesive composition was diluted with a solvent to control the solid content so as to have proper viscosity (500

TABLE 1

| | Ethylhexyl Acrylate | Acrylic Acid | Butyl Acrylate | Lauryl Acrylate | Hydorxybutyl Acrylate | b-Carboxyethyl Acrylate | Carbitol Acrylate | FM-0721 | FM-0711 | Molecular Weight (10,000 g/mol) |
|---|---|---|---|---|---|---|---|---|---|---|
| Polymer 1 | 98 | 2 | | | | | | | | 200 |
| Polymer 2 | 60 | | | 20 | 20 | | | | | 185 |
| Polymer 3 | 40 | | | 40 | 20 | | | | | 185 |
| Polymer 4 | | 2 | 50 | 48 | | | | | | 200 |
| Polymer 5 | 98 | | | | | 2 | | | | 185 |
| Polymer 6 | 60 | | | | | 2 | 38 | | | 185 |
| Polymer 7 | 70 | | | | | 2 | 38 | | | 180 |
| Polymer 8 | 50 | | | | | | | 50 | | 3 |
| Polymer 9 | 80 | | | | | | | 20 | | 4 |
| Polymer 10 | | 50 | | | | | | | 50 | 4 |

In Table 1, FM0721 and FM0711 are a multifunctional polysiloxane, and products of Chisso Corporation were used, and the FM series is a polysiloxane-present (meth)acrylate.

2. Manufacture of Adhesive Film

With the polymers prepared in Table 1, the first polymer and BXX-5240 that is an epoxy-based crosslinking agent or BXX-5270 or TKA-100 that is an isocyanate-based crosslinking agent were added as in the following Table 2, diluted in 18% by weight with an ethyl acetate solution and introduced to the second polymer (100 g) described in the cp to 1500 cp) for coating, and mixed for 15 minutes or longer using a mechanical stirrer. The result was stored at room temperature (20° C.), and, after removing air bubbles generated during the mixing, a film was formed using an applicator, and the film was dried for 3 minutes at 140° C. using a Mathis oven to prepare each 25 m adhesive film. Properties of each of the adhesive films are as shown in the following Table 3, and a glass transition temperature of the adhesive film is as shown in the following Table 4.

TABLE 3

|  | Storage Modulus (G2, Pa) @-20° C. | Storage Modulus (G1, Pa) @20° C. | First Substrate Early Peel Strength (gf/inch) | First Substrate Late Peel Strength (gf/inch) | Rate of Increase in Peel Strength (%) | Second Substrate Adhesive Strength (gf/inch) | Dynamic Folding |
|---|---|---|---|---|---|---|---|
| Example 1 | $1.9 \times 10^5$ | $4.5 \times 10^4$ | 3.6 | 3.5 | −2.8 | 1132 | OK |
| Example 2 | $1.9 \times 10^5$ | $4.5 \times 10^4$ | 3.6 | 3.9 | 8.3 | 1210 | OK |
| Example 3 | $1.9 \times 10^5$ | $4.5 \times 10^4$ | 3.5 | 3.5 | 0.0 | 1260 | OK |
| Example 4 | $1.9 \times 10^5$ | $4.5 \times 10^4$ | 2.7 | 2.5 | −7.4 | 1224 | OK |
| Example 5 | $1.6 \times 10^5$ | $3.5 \times 10^4$ | 3.4 | 3.4 | 0.0 | 1250 | OK |
| Example 6 | $1.6 \times 10^5$ | $3.5 \times 10^4$ | 3.5 | 3.4 | −2.9 | 1300 | OK |
| Example 7 | $1.3 \times 10^5$ | $2.9 \times 10^4$ | 2.8 | 2.9 | 3.6 | 1421 | OK |
| Example 8 | $1.3 \times 10^5$ | $2.9 \times 10^4$ | 2.7 | 3.1 | 14.8 | 1350 | OK |
| Example 9 | $8.3 \times 10^4$ | $3.6 \times 10^4$ | 2.1 | 2 | −4.8 | 980 | OK |
| Example 10 | $8.3 \times 10^4$ | $3.6 \times 10^4$ | 2.2. | 2.3 | 4.5 | 1010 | OK |
| Example 11 | $8.3 \times 10^4$ | $3.6 \times 10^4$ | 2.5 | 2.6 | 4.0 | 995 | OK |
| Comparative Example 1 | $1.9 \times 10^5$ | $4.5 \times 10^4$ | 8.8 | 11.2 | 27.3 | 1007 | OK |
| Comparative Example 2 | $1.6 \times 10^5$ | $3.5 \times 10^4$ | 10.9 | 14.3 | 31.2 | 1325 | OK |
| Comparative Example 3 | $1.3 \times 10^5$ | $2.9 \times 10^4$ | 12.5 | 18.2 | 45.6 | 1250 | OK |
| Comparative Example 4 | $9.5 \times 10^4$ | $3.7 \times 10^4$ | 9.1 | 12.2 | 34.1 | 1215 | OK |
| Comparative Example 5 | $1.0 \times 10^5$ | $3.2 \times 10^4$ | 8.4 | 11.4 | 35.7 | 1345 | OK |
| Comparative Example 6 | $1.3 \times 10^5$ | $3.9 \times 10^4$ | 8.5 | 10.8 | 27.1 | 1053 | OK |

1. Storage modulus (G2, Pa) @−20° C.: storage modulus (G2) was measured at −20° C. using a parallel plate fixture having a diameter of 8 mm after overlapping the adhesive film according to the present application several times and cutting to a specimen having a thickness of 1 mm, and the measurement condition was 1 Hz, 5% strain and 10° C./min.

2. Storage modulus (G1, Pa) @20° C.: storage modulus (G1) was measured at 20° C. using a parallel plate fixture having a diameter of 8 mm after overlapping the adhesive film according to the present application several times and cutting to a specimen having a thickness of 1 mm, and the measurement condition was 1 Hz, 5% strain and 10° C./min.

3. First substrate early peel strength: first substrate early peel strength was measured using a texture analyzer (Stable Micro Systems) while peeling at an angle of 180° and a peeling rate of 2400 mm/minute after cutting the adhesive film according to the present disclosure to a size of one inch, then attaching the film to the first substrate by a 2 kg rubber roller going back and forth once, and storing for 1 day at 23° C.

4. First substrate late peel strength: first substrate late peel strength was measured using a texture analyzer (Stable Micro Systems) while peeling at an angle of 180° and a peeling rate of 2400 mm/minute after cutting the adhesive film according to the present disclosure to a size of one inch, then attaching the film to the first substrate by a 2 kg rubber roller going back and forth once, and storing for 5 days at 40° C.

5. Second substrate adhesive strength: second substrate adhesive strength was measured using a texture analyzer (Stable Micro Systems) while peeling at an angle of 180° and a peeling rate of 300 mm/minute after cutting the adhesive film according to the present disclosure to a size of one inch, then attaching the film to the second substrate by a 2 kg rubber roller going back and forth once, and storing for 1 day at 23° C.

6. Dynamic folding test: after preparing the adhesive film according to the present disclosure to a specimen having a 2 set stack up structure, the specimen was inserted to a parallel plate having a spacing of 5 mm, and a test of folding and unfolding for 100,000 times at 25° C. was conducted. After the test was finished, the specimen was collected, and air bubble generation, delamination, hard coating layer cracks were visually observed. It was indicated as OK when there was no air bubble generation and delamination, and no hard coating layer cracks, and it was indicated as NG when air bubbles, delamination, or hard coating layer cracks occurred.

TABLE 4

|  | Glass Transition Temperature of Adhesive Film (° C.) |
|---|---|
| Example 1 | −83 |
| Example 2 | −83 |
| Example 3 | −83 |
| Example 4 | −83 |
| Example 5 | −58 |
| Example 6 | −58 |
| Example 7 | −53 |
| Example 8 | −53 |
| Example 9 | −54 |
| Example 10 | −54 |
| Example 11 | −54 |
| Comparative Example 1 | −83 |
| Comparative Example 2 | −58 |
| Comparative Example 3 | −53 |
| Comparative Example 4 | −84 |
| Comparative Example 5 | −89 |
| Comparative Example 6 | −86 |

As seen from Table 3, it was identified that, by comprising one or more types of the monomer of Chemical Formula 1, the adhesive film according to one embodiment of the present application was able to prevent defects such as tearing of the adhesive film in the peeling process by preventing an increase in the peel strength even when stored for a long period of time at room temperature.

It was identified that Examples 1 to 11 of Table 3 had a lower rate of increase in the release peel strength compared to Comparative Example 1 to Comparative Example 6, and accordingly, it was identified that peel strength of the adhesive film according to the present application was maintained at a certain level without increasing.

Particularly, it was identified that Examples 5 to 11 of Table 3, in which the alkyl (meth)acrylate-based resin included in the second (meth)acrylate of the present application comprises an alkyl (meth)acrylate having 1 to 10 carbon atoms; and an alkyl (meth)acrylate having 11 to 30 carbon atoms, maintained lower storage modulus at −20° C. compared to Examples 1 to 4. In other words, it was identified that storage modulus at a low temperature of −20° C. was particularly effectively lowered while lowering a glass transition temperature (Tg) of the film, and an excellent interlayer stress relief function was obtained even though folding and unfolding were repeated at low temperature and room temperature when used in the foldable display.

Comparative Examples 1 to 6 of Table 3 are cases of not comprising the monomer of Chemical Formula 1 according to the present application, and it was identified that, although adhesive strength with the cover window later was maintained at a certain level or higher, release peel strength increased above a specific range when stored for a long period of time in a heated state, and as a result, problems occurred in the process due to an increase in the release peel strength.

In addition, it was identified that the adhesive film according to one embodiment of the present application had an excellent interlayer stress relief function by satisfying the ranges of Equation (A) and Equation (B) even though folding and unfolding were repeated when used in the foldable display later, and damages on the display were prevented in the foldable display, and it was identified that delamination did not occur even when folding and unfolding were repeated when used in the foldable display later by having excellent adhesive strength for the cover window.

What is claimed is:

1. An adhesive film comprising:
   a first polymer comprising a first (meth)acrylate resin and at least one type of monomer of the following Chemical Formula 1; and
   a second polymer comprising a second (meth)acrylate resin,
   wherein the first polymer comprises the following monomers (by weight %):
   a) 0-80% Ethylhexyl Acrylate; b) 0-50% Butyl Acrylate; c) 0-50% FM-0721; and d) 0-50% FM-0711, with the proviso that at least one of FM-0721 or FM-0711 is present, and with the proviso that at least one of Ethylhexyl Acrylate or Butyl Acrylate is present; wherein the FM0721 and the FM0711 are multifunctional polysiloxane;
   wherein the second polymer comprises the following monomers (by weight %):
   a) 0-98% Ethylhexyl Acrylate; b) 0-2% Acrylic Acid; c) 0-50% Butyl Acrylate; d) 0-48% Lauryl Acrylate; and e) 0-20% Hydroxybutyl Acrylate, with the proviso that at least one of Ethylhexyl Acrylate or Butyl Acrylate is present;
   wherein the adhesive film further comprises a crosslinking agent selected from the group consisting of BXX-5240, BXX-5627, and TKA-100;
   wherein the weight ratio of the first polymer to the second polymer is in a range from 0.05:99.95 to 0.3:99.7;
   wherein the crosslinking agent is present in an amount of 0.03 parts by weight (pt) to 0.07 parts by weight (pt) per 100 parts by weight of the first polymer and second polymer combined;
   wherein an early peel strength of the adhesive film after stored for 1 day at 23° C. is greater than 0 gf/inch and less than or equal to 10 gf/inch, and a late peel strength of the adhesive film after being stored for 5 days at 40° C. is greater than 0 gf/inch and less than or equal to 10.5 gf/inch;
   wherein a rate of change in the peel strength represented by Equation (1) is greater than or equal to −10% and less than or equal to 20%:

$$[(B-A)/A] \times 100 \qquad \text{[Equation (1)]}$$

in the Equation (1),
   A is the early peel strength; and
   B is the late peel strength;
   the adhesive film is cut to a size of one inch×one inch to attach one surface thereof to a first substrate and then being stored for 1 day at 23° C. before measuring the early peel strength or stored for 5 days at 40° C. before measuring the late peel strength; and
   the first substrate is a silicone-based substrate; and
   wherein the adhesive film has a glass transition temperature (Tg) of higher than or equal to −90° C. and lower than or equal to −40° C.:

[Chemical Formula 1]

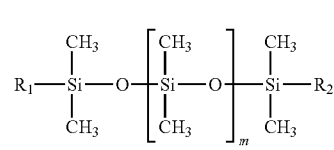

in the Chemical Formula 1,
   R1 is hydrogen; or an alkyl group;
   R2 is a functional group comprising a (meth)acryloyl group; and
   m is an integer of 0 to 200.

2. The adhesive film of claim 1, wherein an adhesive strength of the adhesive film after attaching one surface of the adhesive film to a second substrate and then being stored for 1 day at 23° C. is at least 500 gf/inch; and the second substrate is a glass or polyimide (PI) substrate.

3. The adhesive film of claim 1, wherein a content of the first polymer is greater than or equal to 0.01 parts by weight and less than or equal to 5 parts by weight based on 100 parts by weight of the second polymer.

4. The adhesive film of claim 1, further comprising the first substrate provided on one surface of the adhesive film; or both surfaces of the adhesive film.

5. The adhesive film of claim 1, wherein the first polymer has a weight average molecular weight of greater than or equal to 10,000 g/mol and less than or equal to 100,000 g/mol.

6. The adhesive film of claim 1, wherein a content of the monomer of Chemical Formula 1 is greater than or equal to 5 parts by weight and less than or equal to 95 parts by weight based on 100 parts by weight of the first polymer.

7. The adhesive film of claim 1, wherein the adhesive film has a thickness of greater than or equal to 5 μm and less than or equal to 100 μm.

8. A foldable display device comprising the adhesive film of claim 1.

9. A method for manufacturing an adhesive film, the method comprising:
preparing a first substrate; and
forming an adhesive film by coating an adhesive composition on one surface of the first substrate,
wherein the first substrate is a silicone-based substrate;
the adhesive composition comprises a first polymer comprising a first (meth)acrylate resin and at least one type of a monomer of the following Chemical Formula 1; and a second polymer comprising a second (meth)acrylate resin;
wherein the first polymer comprises the following monomers (by weight %):
a) 0-80% Ethylhexyl Acrylate; b) 0-50% Butyl Acrylate; c) 0-50% FM-0721; and d) 0-50% FM-0711, with the proviso that at least one of FM-0721 or FM-0711 is present, and with the proviso that at least one of Ethylhexyl Acrylate or Butyl Acrylate is present; wherein the FM0721 and the FM0711 are multifunctional polysiloxane;
wherein the second polymer comprises the following monomers (by weight %):
a) 0-98% Ethylhexyl Acrylate; b) 0-2% Acrylic Acid; c) 0-50% Butyl Acrylate; d) 0-48% Lauryl Acrylate; and e) 0-20% Hydroxybutyl Acrylate, with the proviso that at least one of Ethylhexyl Acrylate or Butyl Acrylate is present;
wherein the adhesive film further comprises a crosslinking agent selected from the group consisting of BXX-5240, BXX-5627, and TKA-100;
wherein the weight ratio of the first polymer to the second polymer is in a range from 0.05:99.95 to 0.3:99.7;
wherein the crosslinking agent is present in an amount of 0.03 parts by weight (pt) to 0.07 parts by weight (pt) per 100 parts by weight of the first polymer and second polymer combined;
wherein a rate of change in the peel strength represented by Equation (1) is greater than or equal to −10% and less than or equal to 20%:

$$[(B-A)/A] \times 100 \qquad [\text{Equation (1)}]$$

in the Equation (1),
A is the early peel strength; and
B is the late peel strength;

the adhesive film has a glass transition temperature (Tg) of higher than or equal to −90° C. and lower than or equal to −40° C.; and
a content of the monomer of Chemical Formula 1 is greater than or equal to 5 parts by weight and less than or equal to 95 parts by weight based on 100 parts by weight of the first polymer:

[Chemical Formula 1]

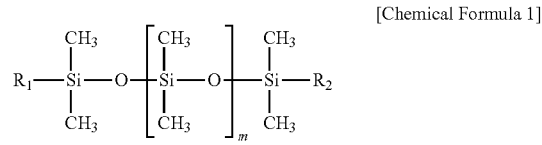

in the Chemical Formula 1,
R₁ is hydrogen; or an alkyl group;
R₂ is a functional group comprising a (meth)acryloyl group; and
m is an integer of 0 to 200.

10. The method for manufacturing an adhesive film of claim 9, wherein the forming of an adhesive film by coating an adhesive composition on one surface of the first substrate further comprises drying after coating the adhesive composition.

11. The method for manufacturing an adhesive film of claim 10, further comprising attaching one surface of the adhesive film to a second substrate after the forming of an adhesive film by coating an adhesive composition on one surface of the first substrate,
wherein the second substrate is a glass or polyimide (PI) substrate; and an adhesive strength after attaching one surface of the adhesive film to the second substrate and then stored for 1 day at 23° C. is at least 500 gf/inch.

12. The method for manufacturing an adhesive film of claim 10, further comprising removing the first substrate after the forming of an adhesive film by coating an adhesive composition on one surface of the first substrate,
wherein a peel strength for the surface in contact with the first substrate of the adhesive film is greater than 0 gf/inch and less than or equal to 10 gf/inch in the removing of the first substrate.

* * * * *